No. 870,888. PATENTED NOV. 12, 1907.
G. G. KANABLE.
WEIGHING DEVICE.
APPLICATION FILED FEB. 21, 1907.
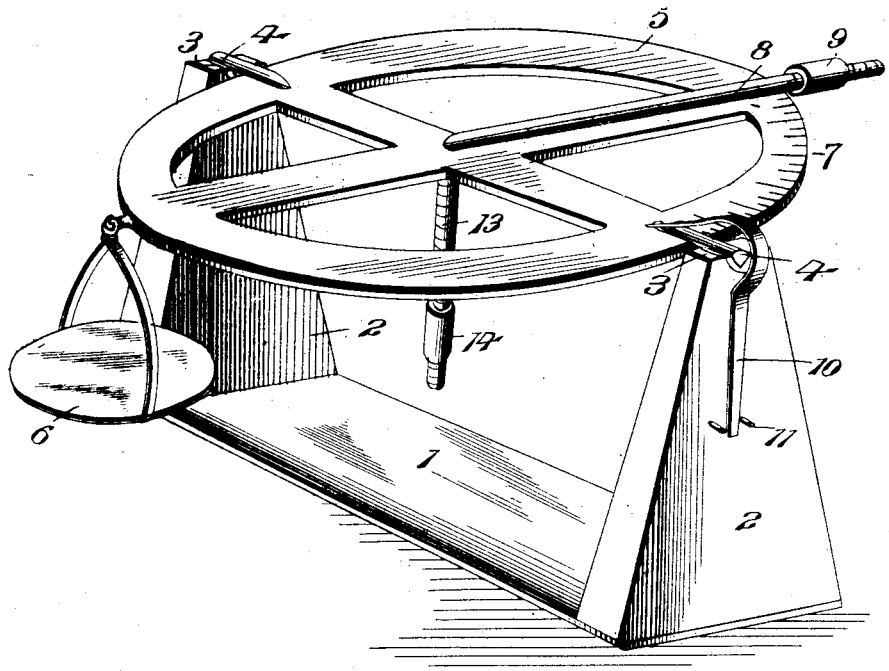
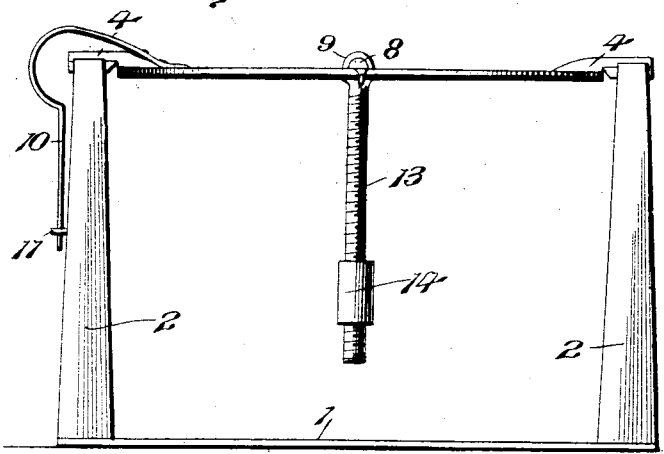
Inventor
G. G. Kanable
Witnesses
By
Attorneys

UNITED STATES PATENT OFFICE.

GROVER G. KANABLE, OF ROSE FARM, OHIO.

WEIGHING DEVICE.

No. 870,888.  Specification of Letters Patent.  Patented Nov. 12, 1907.

Application filed February 21, 1907. Serial No. 358,704.

*To all whom it may concern:*

Be it known that I, GROVER G. KANABLE, a citizen of the United States, residing at Rose Farm, in the county of Morgan and State of Ohio, have invented certain new and useful Improvements in Weighing Devices, of which the following is a specification.

This invention has for its object an improved construction of weighing device or scale, which is composed of comparatively few and simple parts that will be durable and sensitive in operation, and the invention consists in certain constructions and arrangements of parts hereinafter described and claimed.

For a full description of the invention and the merits thereof and also to acquire a knowledge of the details of construction of the means for effecting the result, reference is to be had to the following description and accompanying drawings, in which:

Figure 1 is a perspective view of my improved weighing device; and, Fig. 2 is a side elevation thereof.
Corresponding and like parts are referred to in the following description and indicated in all the views of the drawings by the same reference characters.

Referring to the drawing, the numeral 1 designates the base of the device from which the two standards 2 project. The standards 2 are formed at their upper ends with curved bearing recesses 3 adapted to accommodate the knife edge journals 4 that project outwardly in true diametrical position from the margin of the balance disk 5.

The balance disk 5 is, as shown, mounted to rock in a vertical plane at true right angles to the journals 4, and the said disk carries a tray 6, or the like, which is suspended therefrom at a point equidistant in the margin of the disk from the knife edge journals 4, that constitute the axis. The disk 5 displays a scale or graduations, as indicated at 7, extending from one journal for a distance of ninety degrees. Coacting with these graduations is a balance arm 8 which is pivoted at one end at the exact center of the disk, and which is adapted to swing so as to slide over the upper face of the disk, as clearly illustrated in the drawing. The outer free end of the arm 8 carries a weight 9 which is preferably mounted thereon in an adjustable manner, the adjustment in the present instance being effected by means of a threaded connection between the weight and the outer extremity of the balance arm.

To limit the rocking movement of the balance disk 5 in either direction from a true level position, a finger 10 is secured to the disk at one of the knife edge journals 4, and extends or curves outwardly and downwardly over the outer side of the adjacent standard 2 which is provided with outwardly projecting pins 11 spaced from each other and adapted to be engaged by the end of the finger 10 in an evident manner.

From the foregoing description in connection with the accompanying drawing, it is obvious that articles placed in the pan 6 or other article holding device that is supported by the balance disk 5, may be weighed by swinging the balance arm 8 over the face of the disk until the disk assumes a true level position. In order to increase the weighing facilities of the disk, I preferably secure to the center thereof, a downwardly extending rod or arm 13 which depends from the exact center of the disk and which is provided with an adjustable weight 14, which may be adjusted from the outer extremity of the arm 13 to the disk, so as to increase or decrease the leverage effect of this suspended arm.

It is to be understood that my invention is not limited to the swinging tray or pan 6, but that a platform or other equivalent device may be used in lieu thereof.

Having thus described the invention, what is claimed as new is:

1. A weighing device consisting of a base, spaced standards rising from said base, a disk provided with journals at diametrically opposite points mounted in the upper ends of said standards whereby the disk is mounted between said standards to rock in a vertical plane, means for supporting the articles to be weighed from said disk at a point equidistant from said journals, a balance arm pivotally mounted at one end at the center of the disk to swing over the face of said disk on the opposite side of said journals from the article holding means, and a weight adjustably mounted on the free end of said arm.

2. In a weighing device, the combination of spaced standards, a disk journaled between said standards to rock in a vertical plane about a diametrical axis, means for supporting the articles to be weighed from said disk at a point equidistant from said journals and at one side of the diameter, a balance arm pivoted at the center of the disk to swing over the face thereof on the opposite side of the diameter, and a depending arm secured to the center of the disk and extending at right angles to the face thereof, said last named arm being provided with an adjustable weight, as and for the purpose set forth.

3. In a weighing device, the combination of spaced standards, a disk journaled between said standards to rock in a vertical plane about a diametrical axis, means for supporting the articles to be weighed from such disk at a point equidistant from such journals and at one side of the diameter, a balance arm pivoted at the center of the disk to swing over the face thereof on the opposite side of the diameter, and a depending arm secured to the center of the disk and extending at right angles to the face thereof.

4. A weighing device consisting of a base, spaced standards rising from said base and provided in their upper ends with recesses, knife edge journals mounted in said recesses, a disk to which said journals are secured and from which they project outwardly in diametrically opposite position, whereby the disk is mounted between said standards to rock in a vertical plane, means for supporting the articles to be weighed from said disk at a point equidistant from said journals and at one side of the diameter, a balance arm pivotally mounted at one end at the center of the disk to swing over the face of the disk on the opposite side of said diameter, one of said standards being provided with spaced pins, and a finger secured to the disk at one of the journals and extending outwardly and downwardly over the outer side of the adjacent standard with its lower end mounted between said pins, as and for the purpose set forth.

In testimony whereof I affix my signature in presence of two witnesses.

GROVER G. KANABLE. [L. S.]

Witnesses:
SIMEON M. WINN,
ARTHUR JOHNS.